3,356,609
AEROBIC TREATMENT OF SEWAGE
Joseph H. Bruemmer, Grand Island, N.Y., assignor to United Carbide Corporation, a corporation of New York
Filed May 3, 1966, Ser. No. 547,323
6 Claims. (Cl. 210—7)

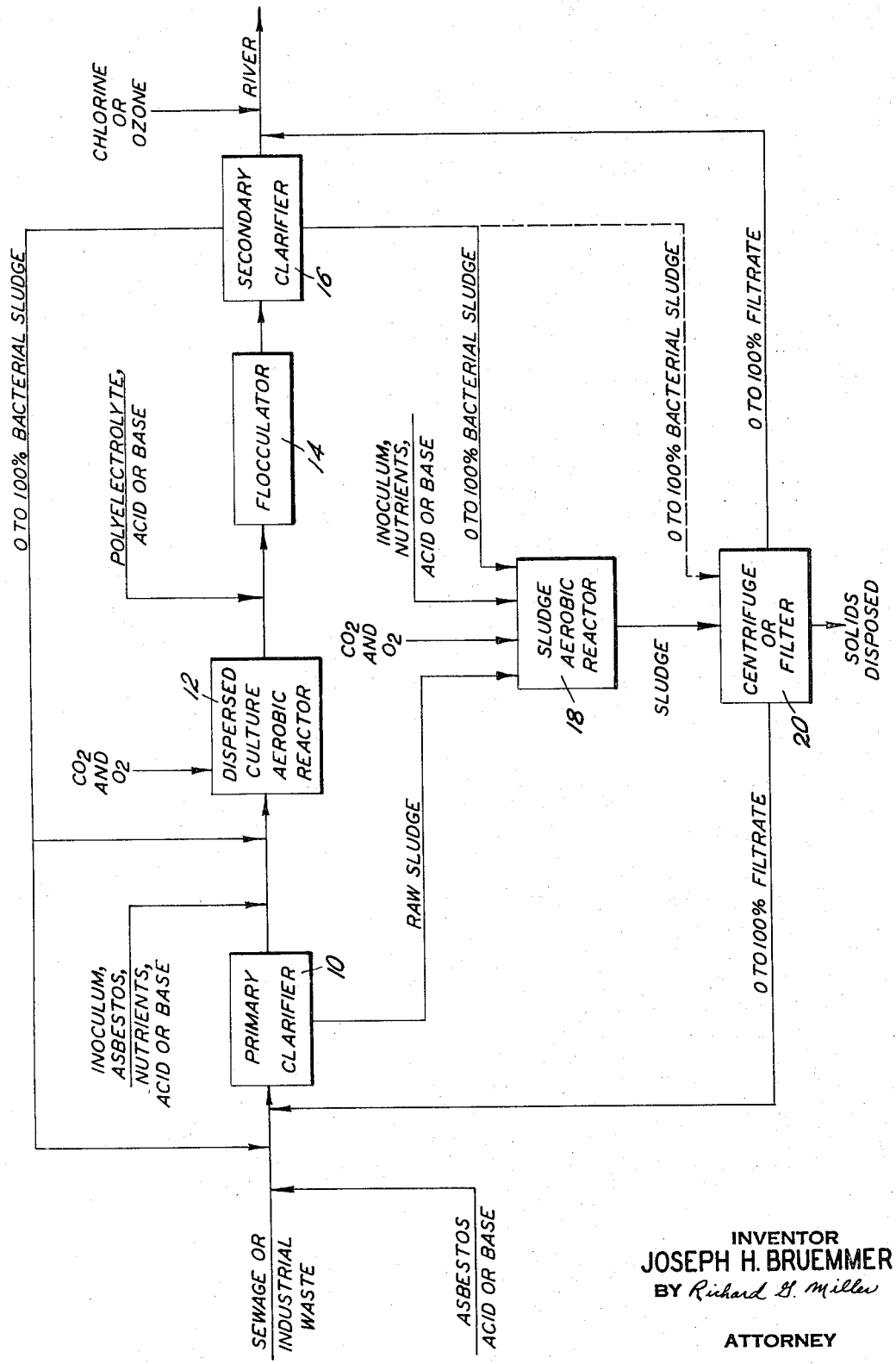

The present invention relates in general to the clarification and purification of domestic sewage and other polluted waste liquids, and more particularly to a treatment process by means of which the water medium of these waste streams is returned to natural water resources substantially free of carbon, nitrogen and phosphorus nutrients.

In general, it is the object of treating domestic and/or industrial wastes containing pollutional materials, hereinafter called sewage, to remove soluble nutrients by biological oxidation and by conversion to cellular material. In current usage, waste treatment involves broadly the steps of settling the sewage to remove solids of large particle size, subjecting the effluent from the settling tanks to some aerobic biological treatment, separating the cell mass produced thereby from the liquid medium and discharging the purified liquid for ultimate reuse. With respect to the aerobic biological treatment, this process step is principally either of two types; namely, the trickling filtration method or the activated sludge method, though many modifications of these types have been developed and utilized. By the trickling filter method, sewage is allowed to trickle down through a bed of broken stone, clinkers, slate or the like carrying on their surfaces biologic slimes which oxidize to some degree its organic content.

Like the trickling filter, the activated sludge process is a biological contact method in which living aerobic organisms and the organic solids of the sewage are brought together in an environment favorable for the aerobic decomposition of the solids. Since this type of treatment is usually employed following plain sedimentation, the sewage contains some suspended and colloidal solids and, when agitated in the presence of air, the suspended solids form nuclei on which biological life develop and gradually build up to larger solids which are known as activated sludge.

Activated sludge is a brownish floc-like substance consisting largely of organic matter obtained from the sewage, and inhabited by myriads of bacteria and other forms of biological life. Activated sludge with its living organisms has the property of absorbing or adsorbing colloidal and dissolved organic matter including ammonia from the sewage so that the organic content is reduced. The biologic organisms utilize the sorbed material as food and convert it into insoluble non-putrescible solids. Much of this conversion is a step-by-step process. Some bacteria attack the original complex substances to produce simpler compounds as their waste products. Other organisms use these waste products to produce still simpler compounds and the process continues until the final waste products can no longer be used as food for bacteria. Cell synthesis, on the other hand, with nitrogen and phosphorus being incorporated into protoplasm, is relatively slow compared to rapidly growing organisms.

The solids separated from sewage in the initial settling step and the bacterial solids produced in the process of aerobic biological treatment are further treated biologically to stablize and reduce the solids for disposal. The conventional process is anaerobic digestion of 60 to 70% of the mass to $CH_4$, $CO_2$, $H_2S$ and $NH_3$. In the process much of the C, N and P nutrients that were originally removed in the aerobic biological process are solubilized. This liquid must again be subjected to aerobic biological treatment but most of the nutrients are not removed by this overloading of the system.

Most domestic and industrial waste streams contain in addition to large amounts of nutrient carbon, relatively smaller quantities of nitrogen and phosphorus also in nutrient form. These nitrogen and phosphorus nutrients, unless removed from the treated sewage effluent returned to natural water resources, stimulate the growth of microorganisms and plant life in otherwise clean water, thus giving rise to an additional pollution problem. Almost no prior proposed sewage treatment processes even attempt removal of nitrogen and phosphorus, and those that do make such an attempt are not adequate in this regard.

It is accordingly the principal object of the present invention to provide a sewage treatment process which is capable of returning a water effluent to resources substantially free of carbon, nitrogen and phosphorus.

In the drawing, the figure is a flow diagram of a principal process embodiment of the present invention.

In essence, the process comprises subjecting a sewage stream to a primary clarification to remove as much as practical of the solids content, delivering the clarified effluent therefrom to a dispersed culture aerobic reactor, and the solids, i.e. the primary or raw sludge, to a sludge aerobic reactor. The effluent from the primary clarifier is enriched with a suitable source of carbon and is subjected to adequate aerobic biological treatment in the dispersed culture aerobic reactor, after which the entire mass is transferred to a flocculation tank and chemically and/or mechanically treated to cause an agglomeration of the cell mass grown in the said dispersed culture aerobic reactor, and from this flocculation tank to a secondary clarifier where the agglomerated cell masses are mechanically removed. The effluent from the secondary clarifier being free of at least 99% of the original N and P content can safely be returned to the water resources after chlorination or similar disinfection. The raw sludge from the primary clarifier is fed to a sludge aerobic reactor in which the oxygen tension is maintained at a high level by circulating gas containing more than 30% oxygen and the carbon content is enriched as in the dispersed culture aerobic reactor. In addition, any part or all of the bacterial sludge from the secondary clarifier can be combined with the sludge from the primary clarifier in the sludge aerobic reactor. Or if desired, the secondary sludge can by-pass the aerobic reactor by going directly into centrifuge or filter. This solid product may be further processed as supplement for animal feed. Moreover, any part or all of the sludge from the secondary clarifier can be fed back to the stream going into the primary clarifier to aid in clarification of incoming sewage, and/or to the dispersed culture aerobic reactor where it provides inoculum for the incoming settled sewage from the primary clarifier. After suitable treatment in the sludge aerobic reactor, the combined sludges from the primary and secondary clarifiers are centrifuged or filtered or otherwise separated into liquidus and solidus fractions and the solids disposed of. The liquid fraction can be recycled if desired, or returned to the natural water resources.

The waste material, hereinafter in the specification and in the appended claims termed simply "sewage," which is suitably treated in accordance with the process of the present invention can be any domestic or industrial waste which is polluted with organic and/or inorganic nutrients or combinations thereof, and is deficient in nutrient carbon and/or nitrogen with respect to phosphorus for purposes of cell formation (as distinguished from energy production).

The weight ratio of carbon to nitrogen to phosphorus, conventionally referred to simply as CNP, in ordinary, domestic sewage is approximately 70:17:1. The CNP of the average bacterial protoplasm is approximately 106:16:1. Since in accordance with the present process it is essential that substantially all of the phosphorus and nitrogen in the sewage be ultimately "contained" in cell protoplasm and isolated from the purified effluent water, the carbon available for cell production must be substantially increased. This increased nutrient carbon is also necessary since about half of the available carbon is consumed in cell synthesis for energy production, i.e. the formation of $CO_2$ in the breaking down of complex organic molecules to form cell nutrients.

Considering the figure, the initial sewage stream is channeled, either intermittently or continuously to a primary clarifier 10, to remove as much as practical of the organic solids content. This is important to provide essentially a soluble feed to the dispersed culture reactor. The structure and/or method of operation of the primary clarifier is not a critical factor, but rather can be any of the conventional designs already in use in prior known processes. Advantageously, unless the mechanical clarifier is sufficiently effectual by itself, chemicals which aid in separation of the liquid and solid phases can be employed such as absestos, slagwools, rock wools or adjustment of pH with mineral acid or base not containing nitrogen or phosphorus. In addition, 0 to 100% of the bacterial sludge from the secondary clarifier can be added to aid coagulation. The liquid effluent from the primary clarifier 10 should not contain more than about 0.0100 percent, preferably 0.005 percent suspended solids on an anhydrous weight basis. Bacterial sludges are not considered to be "suspended solids." It is to be understood, moreover, that in dealing with particular problems involving sewage containing less than about 0.0100 percent, preferably 0.005 percent suspended solids, the primary clarifier can be omitted as well as subsequent treatment steps ordinarily used for the raw sludge therefrom.

The liquid effluent from primary clarifier 10 is fed either intermittently or continuously to a dispersed culture aerobic reactor 12 provided with means for bubbling and recirculating oxygen into the sewage, means for introducing a source of nutrient carbon, and where climate requires, heating means to maintain the temperature of the sewage in the reactor at between about 10° C. and about 50° C. Preferably the temperature is maintained at between 25° C. and 40° C. Oxygen with purity of ≧30% and preferably 60 to 100% is bubbled and recirculated through the reactor at rates from 0.01 to 1 volume per minute to maintain $pO_2$ of liquid above 20 mm. Hg for continuous feeding and preferably above 200 mm. Hg for high strength feed during intermittent feeding. Impellers and other mixing devices common to commercial fermentation equipment are utilized to ensure thorough and complete mixing.

The dispersed nature of the microorganisms in the dispersed culture aerobic reactor renders the operation of the process step carried out in this reactor quite different from that which occurs in an activated sludge operation of conventional treatment procedures. In the latter operation the bacterial culture present is in its declining phase of growth in which the bacteria use much of the available carbon to produce a flocculating substance, and therefore has less carbon available for incorporation of nitrogen and phosphorus into cell mass, and in which their facility for consuming organic material is relatively low. Also the types of bacteria which are capable of producing the flocculating substance are limited. Thus the number of different kinds of orangic pollutants which can suitably be treated by the activated sludge process is also limited.

In contrast, the dispersed culture aerobic reactor of the present process contains the microorganisms in a highly dispersed state—existing as individuals or as small clusters of no more than about twenty or so bacteria. In this dispersed condition the bacteria are in their most active state of growth and utilize nutrient material for cell mass at a much more rapid rate than do the microorganisms of a conventional activated sludge system.

The dispersed condition of the bacteria is maintained in the dispersed culture aerobic reactor by rapid mixing and by insuring that the nutrients in the sewage stream are introduced thereinto at a sufficiently high rate and that the balance of carbon, nitrogen, and phosphorus in nutrient form is appropriate for protoplasm production. As expressed hereinabove, maintenance of the proper CNP ratio is vital if the phosphorus and nitrogen values of the raw sewage are to be removed therefrom chemically combined in cell protoplasm.

Accordingly and in view of the general deficiency of usable carbon in the sewage streams treated in the present process, a carbon source is added to the sewage in the dispersed culture aerobic reactor to maintain a weight ratio of carbon to phosphorus in the sewage of from about 150:1 to about 100 to 1. The carbon source can be any of a vast variety of substances including organic compounds (preferably free of nitrogen and/or phosphorus) such as monosaccharides, disaccharides and industrial wastes such as molasses, food processing, pulp, pharmaceutical and fermentation by-products, and inorganic carbonates such as sodium carbonate.

A particularly preferred embodiment of the present process is that in which the nutrient carbon added to the dispersed culture aerobic reactor is in the form of carbon dioxide gas. Separate means can be employed to bubble $CO_2$ into the reactor or both $CO_2$ and oxygen can be introduced thereinto through the same means. Although pressures greater than atmospheric in the reactor are not essential to successful operation, it is advantageous for economic reasons to provide the reactor with a gas tight closure and to recirculate both the oxygen and the carbon dioxide. In this manner the $CO_2$ concentration in the liquid phase is easily maintained within the partial pressure range of from about 15 up to about 150 mm. Hg. The recirculation of the $CO_2$ also permits the utilization of $CO_2$ produced by the bacteria from some of the available nutrient material of the raw sewage. Partial pressures of $CO_2$ in the liquid phase above about 150 mm. Hg should be avoided because of adverse effects upon the microorganisms. Care should be taken to assure the adequate presence of $CO_2$-fixing species of bacteria such as Bacillus, Thiobacillus and Nitrosomonas in the dispersed culture aerobic reactor. The pH of the system when $CO_2$ is the added carbon source preferably should be within the range of about 6 and about 8. This range takes into account the equilibrium between $HCO_3$ and $CO_2$.

In the broader aspects of the process, i.e. when the carbon source is not necessarily $CO_2$ the pH range can be sufficiently broad to include all values favorable to growth of the microorganisms. This range is from about 3 to 11, with 5 to 9 being preferred and 7 being an optimum value. For certain sewage it is necessary to adjust the pH in reactor 12 by the addition of acids or bases, whichever is required. Organic acids and bases can be used to supplement the usable carbon content of the sewage to support growth of the micro-organisms, but in no event should nitrogen and/or phosphorus containing acids or bases, either organic or inorganic, be used since these would add unduly to the N and P "load" of the system.

Ordinarily it is not necessary to add all types of microorganisms to the dispersed culture aerobic reactor tank since the most common types which decompose waste material are already present in the raw sewage entering the tanks. It is possible, however, that some industrial wastes are sufficiently acidic or basic that an insufficient number of bacteria have survived therein prior to the beginning of treatment and must be supplemented. Further, even in domestic sewage, the $CO_2$, the nitrogen and the phosphorus fixing bacteria, may be absent or inadequate in number. In these events inoculation of the reactor tank should be undertaken. In addition, it is advantageous to maintain high cell concentration in the reactor ($10^{10}$–$10^{12}$ cells/ml.) which can be accomplished by recirculating 0–50% of the bacterial sludge from the secondary clarifier.

Typical of bacteria species which are advantageously present in the oxygenation tank are (a) for degradation of organic matter: Cellulomonas, Cytophaga, Bacillus, Vibrio, Pseudomonas, Klebsiella, and Micrococcus; (b) for accelerated conversion: Escherichia, Aerobacter, Pseudomonas, and Bacillus; (c) for $CO_2$ assimilation; Escherichia, Bacillus, Azotobacter, Lactobacillus, Micrococcus, Pseudomonas, Thiobacillus, Nitrobacter, and Corynebacter; (d) for $N_2$ fixation: Azotobacter; and (e) for concentrating phosphorus into granules or polymers in cells: Corynebacterium and Xanthamonas.

Having thus provided a system in the oxygenation tank which meets the aforesaid requirements respecting pH, liquid phase $CO_2$ and $O_2$ content, solids content, the presence of microorganisms, temperature and pressure, the system is maintained within the prescribed values of these parameters for a period of from 1 to about 24 hours. As any incremental volume of the sewage has received this treatment, it can be transferred to the next stage of the process; namely, flocculation in fluocculation tank 14.

Flocculation is the step whereby the nitrogen and phosphorus containing micro-organisms, which have proliferated in the oxygenation tank by virtue of the presence of nutrients therein, are coalesced into masses of suitable size to be separated from the liquid phase by simple mechanical means such as settling or filtering. If necessary to bring about this required coalescence, flocculating agents can be added to and dispersed throughout the flocculation tank. The flocculating agents are in general lime, ferric ion (ferric chloride), alum, and chemical polyelectrolytes such as a polyacrylic acid, poly p-vinyl toluene sulfonic acid, poly p-ethylenimine, poly dimethylaminoethyl acrylate quarternary, alone, in combination, or in conjunction with asbestos. For a particular flocculating agent there may be a pH value range which permits optimum activity of the agent, and accordingly, if the treated sewage egressing from the dispersed culture aerobic reactor 12 has a disadvantageous pH value, the pH should be adjusted to the desired range in the flocculating tank.

Residence time in the flocculating tank is not narrowly critical, usually being between about 5 minutes and 1 hour, and will depend in the main upon such factors as agitation, concentration of polyelectrolyte, and the like.

Following adequate flocculation the sewage thus treated is fed to a secondary clarifier 16 of conventional designs for separation of flocculated cell masses from the clear supernatant liquid. This process requires less than two hours residence. The liquid still contains, in most instances, a relatively high content of bacteria, some of which are harmful to animal life. These harmful bacteria are destroyed by conventional techniques such as chlorination, ozonation, irradiation and the like after being withdrawn from the secondary clarifier 16, but before it is returned to the ground.

At least about 50% and if desirable, 100% of the sludge from secondary clarifier 16 can be centrifuged or filtered directly to provide source of high protein supplement for animal feeds. It may be desirable to further stabilize the secondary sludge in the aerobic reactor 18 where it is combined with the sludge from the primary clarifier 10.

Up to 50% of the secondary sludge can be recirculated to the incoming stream to enhance settling of difficultly settable solids and to the dispersed culture aerobic reactor as inoculum and to maintain high concentration of active organisms.

Raw or primary sludge even when combined with secondary sludge has a CNP ratio that is deficient in available carbon as judged by the CNP of protoplasm. Thus, the sludge aerobic reactor 18 is provided with means to introduce $CO_2$ and oxygen of 30 to 100% purity thereinto and is inoculated with bacteria capable of forming protoplasmic flocs, of converting $CO_2$ into cell protoplasm, of degrading organic matter, and of concentrating phosphorus into granules in cells in the event such bacteria are not already present in the feed sludge. Suitable $CO_2$-fixing species of bacteria are those specified in connection with the dispersed culture aerobic reactor 12, supra.

When necessary the pH of the sludge in reactor 18 is adjusted to the range of about 6 to about 8. The $O_2$ and $CO_2$ are bubbled through the sludge at rates from 0.05 to .5 volume per minute per liquid volume in a manner to maintain $pO_2$ above 20 mm. Hg for continuous feeding conditions and above 200 mm. Hg during periods of intermittent feeding. Mixing and bubbling are relatively slow compared to the rate in tank 12. Agitation of the contents of reactor 18 is kept mild so as not to disturb the protoplasmic floc that is maintained in the reactor. The aerobic sludge reactor 18 can be operated most economically by recirculating gas in a closed tank. Residence of the sludge for treatment is 5 to 10 days at 25 to 35° C.

The treated sludge can be separated into a biological stable solid and a clear supernatant liquid by any conventional means such as a centrifuge or a filtering device 20 shown in the figure. The clear liquor can be recirculated through the main liquid stream for more complete removal of nitrogen and phosphorus, or can be disposed into the ground or receiving stream.

With reference to the drawing of the figure, the following example is provided as further illustration of the treatment process of the present invention:

*Example 1*

Domestic raw sewage containing 250 parts per million by weight (anhydrous) suspended solids, 540 p.p.m. $O_2$—Biological Oxygen Demand (BOD), 180 p.p.m. nitrogen, 10 p.p.m. phosphorus and having a CNP ratio of 54:18:1 is fed continuously into a 50,000 gallon primary clarifier at the rate of 600,000 gallons/day. To the primary clarifier is added daily 60 lbs. lime to adjust the pH to 7.4, 10 lbs. of abestos to aid clarification and 1800 gallons bacterial sludge from the secondary clarifier containing inoculum and polyelectrolyte coagulant from the flocculator. Residence time in the primary clarifier is about 2 hours. The effluent from the primary clarifier (essentially free of organic non-bacterial suspended solids) is fed continuously to the dispersed culture aerobic reactor, a 100,000-gal. closed cylinder, at rate of 25,000 gal./hr. where gas containing 90% $O_2$ and 10% $CO_2$ is circulated through the liquid at rate of 0.1 volume of gas per volume of liquid per minute. A temperature of 30° C. is maintained and the pH is adjusted to 7.2 with 5 lbs. lime per day. Asbestos is added at the rate of 10 lbs. per day to aid bacterial growth. The contents of the reactor is vigorously mixed by conventional fermentation impellers to achieve a "complete mixed" condition. A daily inoculum of 1200 lbs. bacterial sludge from the secondary clarifier (20% of secondary sludge production) maintains the required bacteria concentation. The daily thoughput of the reactor, on the 4-hr. detention time basis, is 600 lbs. N, 45 lbs. P and 6000 lbs. suspended solids plus 1200 lbs. bacterial sludge from the secondary clarifier. The contents of the dispersed culture reactor flows out at a rate of 25,000 gal./hr. to the 2500-gal. flocculator tank where a solution of UCC Polymer X150 is added at the rate of 5 lbs. per day and alum at the rate of 20 lbs. per day. Residence time in the flocculator is 6 minutes. The flow from the flocculator goes to the secondary clarifier, a 25,000-gal. cylinder, where in 1-hour residence time, the bacterial sludge settles out at the rate of 600 lbs. of N, 45 lbs. P, and 6000 lbs. suspended solids per day. The bacterial sludge settles to bottom where it is distributed intermittently as follows: 300 returns per day to the primary clarifier to aid coagulation of incoming sewage; 1200 lbs. go to the dispersed culture aerobic reactor as inoculum and to maintain high cell concentration, $10^{10}$ to $10^{12}$ cells/ml; 4500 lbs. are dewatered by centrifugation and processed for animal feed. The sedimented sludge from the primary clarifier is transferred to the sludge aerobic reactor, having a 20,000 gal. capacity, twice a day at the rate of 3000 gallons per day of 5% solids. The daily inflow is 290 lbs. nitrogen, 7.2 lbs. P, and 1250 lbs. suspended solids. The contents of the sludge aerobic reactor are stirred slowly (impellers 150 r.p.m.) so as not to disturb flocculated growth. A gas mixture of 90% $O_2$ and 10% $CO_2$ is circulated through the mixture by bubbles at rate of 0.1 volume of gas per volume of liquid. Temperature is maintained at 30° C. and the pH remained at 7.2. The separation of the liquid from the treated sludge by centrifugation provides a filtrate that is less than 7 p.p.m. with respect to N, less than 2 p.p.m. with respect to P and BOD of less than 25 p.p.m. $O_2$. This liquid volume of 3000 gal. was recirculated through the liquid stream to effectively remove all of the N and P. The packed solids from the treated sludge is dried for high nitrogen containing fertilizer. Daily yields of 2000 lbs. of dried solids contained 290 lbs. of nitrogen and 7.2 lbs. of phosphorus. The treated water returned to the water resources contains less than 1 p.p.m. nitrogen and phosphorus, and less than 10 p.p.m. BOD and suspended solids.

What is claimed is:

1. Process for treating a water medium sewage stream containing a weight ratio of carbon to phosphorus of less than about 100 to 1 which comprises the steps of; (a) clarifying said sewage stream to a degree such that the suspended organic solids content thereof is less than about 0.0100 weight percent on an anhydrous basis; (b) feeding the clarified liquid to a dispersed culture aerobic reactor maintained at a temperature of from about 10° C. to about 50° C., maintaining the partial pressure of oxygen in the liquid at least at 20 mm. Hg, the pH at a value of from 3 to 11, and supplementing the nutrient carbon content of the sewage stream fed to said dispersed culture aerobic reactor to maintain a weight ratio of carbon to phosphorus such that there is a balance of carbon to phosphorus appropriate for protoplasm production using substantially all of said phosphorus, and agitating the composition thus established in said reactor for a period of about 1 hour to about 24 hours; (c) flocculating and separating the cell mass from the water in the discharge from the dispersed culture aerobic reactor; (d) passing the raw sludge solids separated from the liquid in step (a) to a sludge aerobic reactor containing bacterial inoculum including $CO_2$-fixing and protoplasmic floc forming species, and treating same therein at a temperature of from about 25° C. to 35° C. for from about 5 to 10 days at a pH of from 6 to 8 while bubbling through the liquid phase carbon dioxide and an oxygen containing stream of at least 30 percent oxygen at the rate of 0.05 to 0.5 volumes per minute per liquid volume; and (e) separating the water therefrom.

2. Process according to claim 1 in which the nutrient carbon supplement added to the dispersed culture aerobic reactor is carbon dioxide and is present in a concentration in a liquid not greater than 150 mm. Hg and the pH is from about 6 to about 8.

3. Process according to claim 1 in which at least some of the flocculated cell mass from step (c) is recycled to the dispersed culture aerobic reactor.

4. Process according to claim 1 in which dispersed asbestos fibers are present in the dispersed culture aerobic reactor and the oxygen dissolved in the liquid in said dispersed culture aerobic reactor is provided by bubbling thereinto a gas stream containing at least about 80 to 100 percent oxygen.

5. The process according to claim 1 in which the water isolated in steps (c) and (e) thereof is further treated with a germicidal agent.

6. The process according to claim 1 in which the sewage stream after clarification in step (a) has a suspended organic solids content of less than about 0.005 weight percent on an anhydrous basis.

References Cited

UNITED STATES PATENTS

| | | | |
|---|---|---|---|
| 2,901,114 | 8/1959 | Smith et al. | 210—15 X |
| 3,047,492 | 7/1962 | Gambrel | 210—7 |

MICHAEL E. ROGERS, *Primary Examiner.*